(12) United States Patent
Saito et al.

(10) Patent No.: US 6,529,670 B1
(45) Date of Patent: Mar. 4, 2003

(54) OPTICAL FIBER ARRAY AND OPTICAL LIGHT-WAVE DEVICE, AND CONNECTING THE SAME

(75) Inventors: Tsunetoshi Saito, Tokyo (JP); Toshihiko Ota, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/612,417

(22) Filed: Jul. 7, 2000

(30) Foreign Application Priority Data

Jul. 8, 1999 (JP) .......................................... 11-194041
Oct. 22, 1999 (JP) .......................................... 11-300543

(51) Int. Cl.[7] ............................................... G02B 6/00
(52) U.S. Cl. ........................ 385/137; 385/136; 385/55; 385/59
(58) Field of Search ................................ 385/137, 136, 385/53, 54, 88, 89, 90, 92, 55, 59

(56) References Cited

U.S. PATENT DOCUMENTS 5,327,517 A * 7/1994 Yamada et al. ............. 385/137
6,205,273 B1 * 3/2001 Chen ........................... 359/130

FOREIGN PATENT DOCUMENTS

JP         5-173043         7/1993

* cited by examiner

*Primary Examiner*—Rodney Bovernick
*Assistant Examiner*—Sung Pak
(74) *Attorney, Agent, or Firm*—Oblon, Spivak, McClelland, Maier & Neustadt, P.C.

(57) ABSTRACT

An optical fiber array device including a guide substrate formed with a plurality of optical fiber arranging guide grooves and a cap plate, the optical fiber array device being warped by a contraction stress associated with hardening an adhesive used to attach the guide substrate to the cap plate, the warp being controlled to align the optical fiber array device with a corresponding optical waveguide device.

14 Claims, 8 Drawing Sheets

Fig. 10A
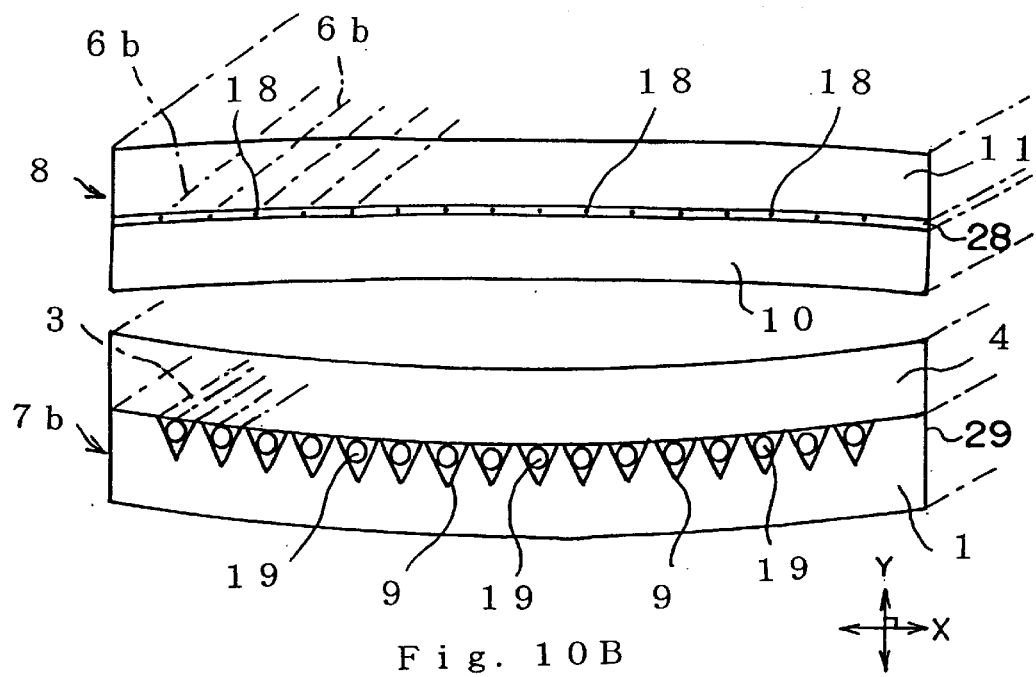
Fig. 10B
Fig. 11
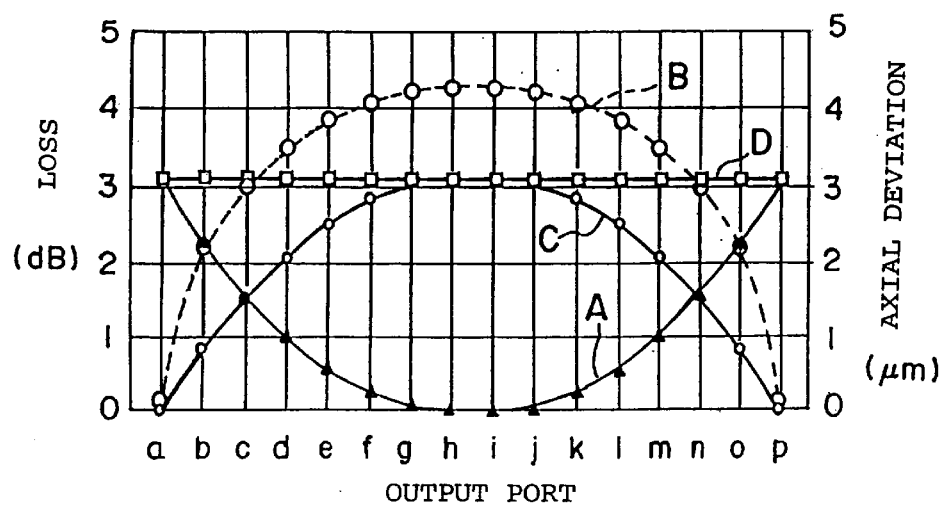

Fig. 12
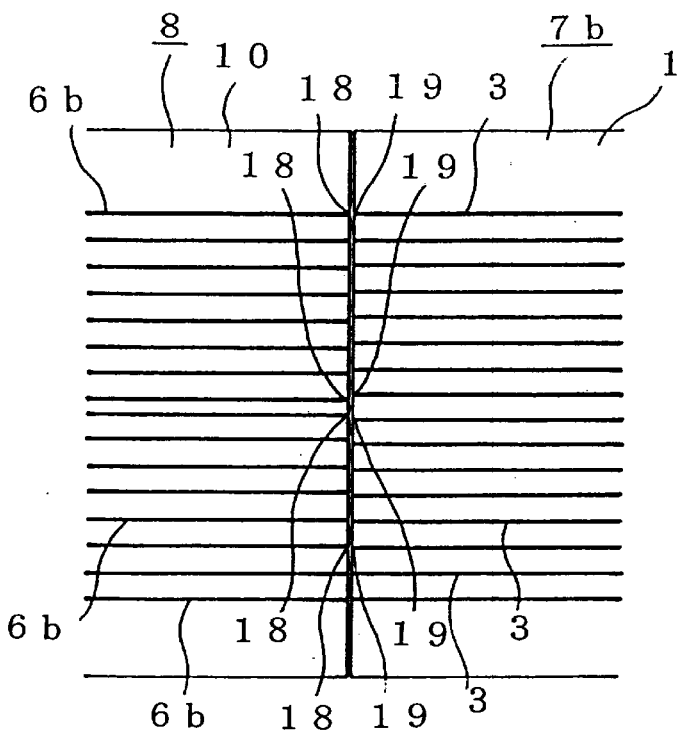
Fig. 13A
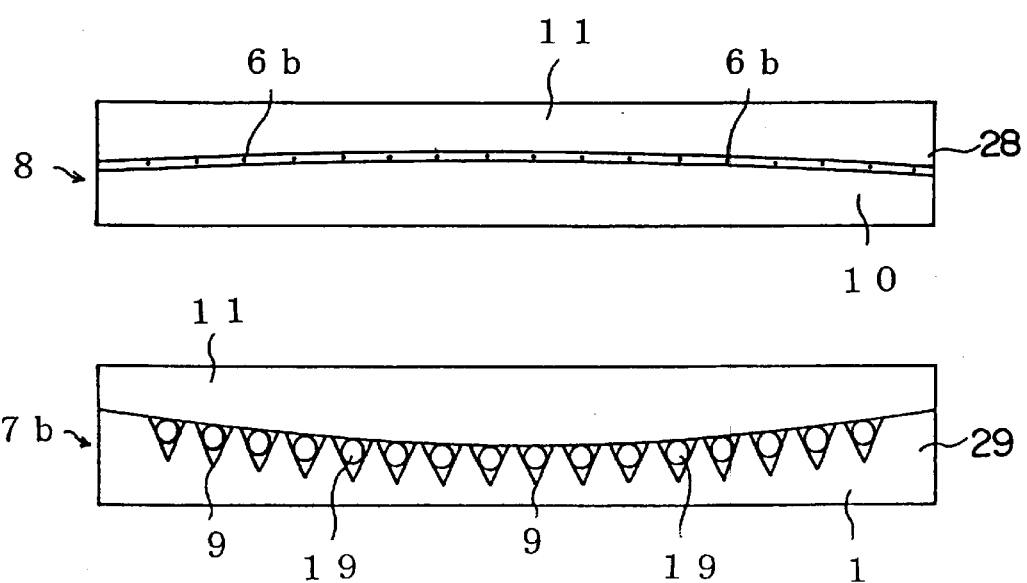
Fig. 13B

OPTICAL FIBER ARRAY AND OPTICAL LIGHT-WAVE DEVICE, AND CONNECTING THE SAME

FIELD OF THE INVENTION

The present invention relates to an optical fiber array device used for optical communication and a method of manufacturing the same, a method of connecting a waveguide of an optical light guide device and an optical fiber of an optical fiber array device with each other, and an optical waveguide module which is formed by connecting an optical fiber array device and an optical waveguide circuit device.

BACKGROUND OF THE INVENTION

Today, for lower prices and denser circuit integration, the field of optical communication sees progress in the commercialization of an optical waveguide circuit (PLC; Planer Light guide Circuit) device in which a plurality of optical waveguides are arranged on a silicon substrate or a quartz substrate. Furthermore, multi-function capabilities required for optical waveguide circuit devices nowadays facilitate higher density integration of optical waveguides to be arranged and large-sized optical waveguide circuit devices.

In general, an optical waveguide circuit device is connected to an optical fiber array device which is formed by arranging optical fibers, and used as a module. FIG. 3 is a perspective view showing a module-type optical device (optical waveguide module) in which an optical fiber array device 7a is connected to the incidence side of an optical waveguide circuit device 8 while an optical fiber array device 7b is connected to the exit side of the optical waveguide circuit device 8.

In FIG. 3, an optical waveguide circuit is formed by an optical waveguide 6 on an optical waveguide substrate 10, whereby the optical waveguide circuit device 8 is formed. The optical waveguide circuit shown in FIG. 3 comprises one incidence-side optical waveguide 6a which branches out through a branch portion 16 such that there are eight optical waveguides 6b on the exit side. The optical waveguide circuit is a splitter-type optical waveguide circuit which divides incident light entering at one optical input part (the incidence side of the incidence-side optical waveguide 6a) and outputs light at eight optical output parts (the exit side of the exit-side optical waveguides 6b). In FIG. 3, an upper glass plate 11 is disposed on the optical waveguide circuit device 8 at the connection terminal surface sides.

The optical fiber array devices 7a and 7b each comprise a guide substrate 1 and a cap plate 4. Although not illustrated in FIG. 3, one or more optical fiber arranging guide grooves for arranging optical fibers 3 are formed in the guide substrates 1. In general, the arranging guide grooves are formed as V-shaped grooves (grooves shaped like a letter "V"). As the coating is removed on the connection terminal surface side of the optical fibers, they are inserted in the V-shaped grooves, and the optical fibers 3 inserted in the arranging guide grooves are capped with the cap plates 4.

One optical fiber 3 is fixed to the optical fiber array device 7a which is on the incidence side, while the eight optical fibers 3 are arranged at equal intervals and fixed to the optical fiber array device 7b which is on the exit side. The optical fibers 3 which are fixedly arranged to the optical fiber array device 7b are led from a core wire of an optical fiber tape which is formed by arranging eight optical fibers 3 in parallel in a line at a pitch of 250 μm, of which coating is removed on the connection terminal surface side and inserted respectively in the V-shaped grooves.

The optical fiber 3 which is fixed to the optical fiber array device 7a is connected to the optical waveguide 6a which is disposed on the incidence side to the optical waveguide circuit device 8, while the eight optical fibers 3 which are fixed to the optical fiber array device 7b are connected respectively to the optical waveguides 6b which are disposed on the exit side to the optical waveguide circuit device 8. In general, the arrangement pitch of the optical waveguides 6b is set to 250 μm which is equal to the arrangement pitch of the optical fibers 3 of the optical fiber array device 7b.

For fabrication of an optical component as shown in FIG. 3, the connection terminal surfaces of respective optical fiber array devices 7a and 7b and the connection terminal surfaces of the optical waveguide circuit device 8 are polished, the connection terminal surface of the optical fiber array device 7a and the connection terminal surfaces of the optical waveguide circuit device 8 on the incidence side are faced towards each other, while the connection terminal surface of the optical fiber array device 7b and the connection terminal surface of the optical waveguide circuit device 8 on the exit side are faced towards each other.

Following this, connection terminal surfaces of the optical fibers 3 which are arranged in the optical fiber array devices 7a and 7b are faced towards the connection terminal surfaces of the optical waveguide 6 disposed at the optical waveguide circuit device 8, and adjusted seas to minimize axial deviations (positional displacements) between the connection terminal surfaces of the optical fibers 3 and the corresponding connection terminal surfaces of the optical waveguide 6. The connection terminal surfaces of respective optical fiber array devices 7a and 7b and the connection terminal surfaces of the optical waveguide circuit device 8 are fixedly adhered to each other with an adhesive or the like which hardens under ultraviolet light (UV).

OBJECT AND SUMMARY OF THE INVENTION

By the way, as described above, the optical waveguide circuit device 8 has gained more and more functions recently, which has led to the development of the optical waveguide circuit device 8 of a splitter-type which divides light impinging upon one optical input part and outputs light at thirty-two optical output parts or sixty-four optical output parts, for example. Where such an optical waveguide circuit device 8 is to be used as a module-type optical component (optical waveguide module) as shown in FIG. 3, as described above, since the arrangement pitch of the optical waveguides 6b on the exit side of the optical waveguide circuit device 8 is 250 μm, a distance between both edges of the exit-side optical waveguides 6b disposed at the optical waveguide circuit device 8 is 7.75 mm if there are thirty-two optical output parts (optical output ports) and it is 15.75 mm if there are sixty-four optical output parts.

Meanwhile, it is generally known that the optical waveguide circuit device 8 warps because of its manufacturing method. For instance, where the optical waveguide circuit device 8 has thirty-two optical output parts, there are thirty-two optical waveguides 6b on the exit side and the width of the optical waveguide circuit device 8 is 8 mm as shown in FIGS. 4A and 4B, and the optical waveguide circuit device 8 using the optical waveguide substrate 10 of silicon warps to the degree of S which is as much as 2 to 3 μm as shown in FIG. 4A. As shown in FIG. 4B, even the optical waveguide circuit device 8 using the optical waveguide substrate 10 of quartz warps in the degree S of as much as 0.5 to 1.0 μm.

As shown in FIGS. 4A and 4B, the degree of warping S is a value which is expressed by the quantity of a deviation in the direction of height (Y-direction in FIGS. 4A and 4B) between the optical waveguides 6b at the center and the optical waveguides 6b at both ends. The directions of warping are opposite between where the optical waveguide substrate 10 of silicon is used and where the optical waveguide substrate 10 of quartz is used.

The warping prohibits the arrangement of the optical waveguides 6b on the exit side of the optical waveguide circuit device 8 (i.e., an arrangement of the cores at the cross section of the optical waveguide circuit device 8) from presenting a linear shape, but causes the arrangement to have a curved shape in accordance with the warping of the optical waveguide circuit device 8. As the optical fiber array device 7b bearing the optical fibers 3 which are arranged in a linear shape is connected to the optical waveguide circuit device 8, axial deviations are generated between the corresponding optical waveguides 6b and the optical fibers 3. This increases connection loss between the optical waveguides 6b and the optical fibers 3.

To solve this problem, Japanese Laid-Open Patent Publication No. 173043 of 1993 proposes to dispose an external force application mechanism to forcibly curve the optical fiber array device 7 outside the optical fiber array device 7. However, due to the requirement of disposal of the external force application mechanism outside the optical fiber array device 7, this method needs a greater number of parts and components to constitute an apparatus which include this mechanism, is a large-sized apparatus due to the external force application mechanism, and demands laborious fabrication, and hence, has a problem in that the cost is high.

Furthermore, as described earlier, for forming of a module-type optical component (optical waveguide module) by bonding the optical fiber array devices 7a and 7b to the optical waveguide circuit device 8, since an ultraviolet light-hardening adhesive or the like is used to bond the optical fiber array devices 7a and 7b to the optical waveguide circuit device 8, if there is other mechanism disposed externally to the optical fiber array device 7b, ultraviolet light for hardening the ultraviolet light-hardening adhesive is blocked and hence hardening of the ultraviolet light-hardening adhesive is disturbed. This makes it difficult to adhere the optical fiber array device 7b and the optical waveguide circuit device 8 with each other.

In addition, since a material for forming the optical fiber array devices 7a and 7b is different from a material for forming the external force application mechanism according to the proposed method above, as a environmental temperatures where the module-type optical component is used changes, the degree of curvature (the degree of warping) of the optical fiber array device 7b which is curved by the external force application mechanism changes, thereby resulting in a problem that it is not possible to apply an appropriate degree of warping to the optical fiber array device 7b. If thermal expansion coefficient of the forming material of the external force application mechanism becomes large and the degree of warping of the optical fiber array device 7b associated with the change in the environmental temperature accordingly becomes large, a load is applied to the connection portion between the optical fiber array device 7 and the optical waveguide circuit device 8. This causes a problem in that connection loss increases and the connection portion is destroyed.

Moreover, in the recent years, a circuit using slab waveguides has been used widely as an optical waveguide circuit which is formed in the optical waveguide circuit device 8. In a circuit using this type of slab waveguides, optical transmission loss in light from slab waveguides at both ends is larger than that in light from slab waveguides at around the center. Hence, when a plurality of respective waveguides on the output side of the slab waveguides are connected to the corresponding optical fibers of the optical fiber array device 7, levels of optical power outputted at respective optical fibers become different from each other, which in turn makes it impossible to execute appropriate signal processing. Due to this, if the levels of the optical power outputted at respective output terminals become different from each other as described above, it is necessary to dispose attenuators for respective output terminals such that all levels of optical power become uniform, which requires a large size and a high cost.

The present invention has been made to solve the problems described above in the conventional techniques. Accordingly, a first object of the present invention is to provide an optical fiber array device which can be connected with an optical waveguide circuit device, which is a connection receiver, at a low connection loss even despite changes in temperature in an environment where the optical fiber array device is used, and which is easily manufactured in a small size at an inexpensive cost, and to provide a method of manufacturing such an optical fiber array device. A second object is to provide a method of connecting a plurality of arranged optical waveguides and optical fibers of an optical fiber array device with each other, and to provide an optical waveguide module using the connection method, with which it is possible to ensure uniform output power at respective optical fibers without using attenuators or other optical components even when the optical fibers are connected to such optical waveguides among which both ends have a greater optical transmission loss than the ones at the central ones as in an optical circuit which comprises slab waveguides as described above.

To achieve the objects above, the present invention provides an optical fiber array device and a method of manufacturing the same, at the same time, a method of connecting the optical waveguides of an optical waveguide circuit device to optical fibers of an optical fiber array device, and an optical waveguide module using the connection method thereof.

That is, an optical fiber array device according to an embodiment of the present invention comprises a guide substrate in which a plurality of optical fiber arranging guide grooves are formed and a cap plate which caps optical fibers which are inserted in the arranging guide grooves, wherein warping is created in the optical fiber array device in the direction of an arrangement of the optical fibers and a shape of the arrangement of the optical fibers at least at the connection terminal surfaces is curved-shaped because of the warping. Furthermore, in an optical fiber array device according to a different embodiment of the present invention, in addition to the structure above, warping is created in the optical fiber array device in accordance with the warping of an optical waveguide circuit device such that connection terminal surfaces of the optical waveguide circuit device approximately match with connection terminal surfaces of the corresponding optical fibers when respective connection terminal surfaces of the plurality of optical fibers which are arranged in the optical fiber array device are faced towards respective connection terminal surfaces of the plurality of optical waveguides which are arranged in the optical waveguide circuit device at the side of the connection receiver of the optical fiber array device.

A method of manufacturing an optical fiber array device according to the present invention is a manufacturing method of the optical fiber array device as described above, and is characterized in creating warping in the optical fiber array device by means of a contraction stress which occurs during hardening of an adhesive which bonds the guide substrate and the cap plate with each other.

Furthermore, the method of manufacturing an optical fiber array device according to the present invention, in another aspect, requires bonding of the guide substrate and the cap plate to each other as they are curved due to an external force to thereby create warping in the optical fiber array device by means of the external force and the contraction stress which occurs during hardening of the adhesive.

Furthermore, the present invention provides the following structure as a method of connecting an optical waveguide circuit device which warps in a curved shape and an optical fiber array device with each other. More precisely, it is a method of connecting optical waveguides and optical fibers with each other, according to which the plurality of optical waveguides, which have approximately the same transmission losses and which are disposed in parallel to each other in an optical waveguide circuit device which warps in a curved shape, wherein the optical connection is simultaneously carried out with the plurality of optical fibers which are disposed in parallel to each other in an optical fiber array device, such method being characterized in that the optical fiber array device has warping which approximately matches with the curved shape of the optical waveguide circuit device and that the optical connection between the optical waveguides and the corresponding optical fibers is simultaneously carried out such that axial deviations between the optical waveguides and the corresponding optical fibers are small when a connection terminal surface of the optical waveguide circuit device which has the curved shape is faced towards a connection terminal surface of the optical fiber array device.

In the present invention of the structure as above, the optical fiber array device comprises a guide substrate in which a plurality of optical fiber arranging guide grooves are formed and a cap plate which caps the optical fibers which are inserted in the arranging guide grooves, and a contraction stress which occurs during hardening of an adhesive which bonds the guide substrate and the cap plate with each other, for example, creates warping in the optical fiber array device in the direction of an arrangement of the optical fibers.

It is generally known that the optical waveguide circuit device, at the side of the connection receiver of the optical fiber array device, warps because of the manufacturing method of the optical waveguide circuit device. According to the present invention, since the shape of the arrangement of the optical fibers arranged in the optical fiber array device is formed in a curved shape, at least on the connection terminal surface side, by the warping in the direction of the arrangement of the optical fibers, when the optical waveguide circuit device and the optical fiber array device are connected to each other, connection terminal surfaces of the optical waveguides arranged in the optical waveguide circuit device are easily aligned to connection terminal surfaces of the optical fibers arranged in the optical fiber array device.

As warping is created in the optical fiber array device in accordance with the warping of the optical waveguide circuit device such that the connection terminal surfaces of the optical waveguides and the connection terminal surfaces of the corresponding optical fibers approximately match with each other when the connection terminal surfaces of the optical fibers of the optical fiber array device are faced with the connection terminal surfaces of the optical waveguides of the optical waveguide circuit device, it is possible to match the connection terminal surfaces of the optical waveguides and the connection terminal surfaces of the corresponding optical fibers with each other, and hence, to connect the optical waveguides and the corresponding optical fibers with each other at a very low connection loss.

Furthermore, according to the present invention, since the warping of the optical fiber array device is created by the contraction stress which occurs during hardening of the adhesive which bonds the guide substrate and the cap plate to each other, fabrication is easy. Unlike where an external force application mechanism is disposed, there is no change in the degree of warping of the optical fiber array device due to expansion or the like caused by heating of the external force application mechanism in accordance with environmental temperatures where the device is used, which in turns allows the maintenance of a low connection loss between the optical fiber array device and the optical waveguide circuit device. This does not lead to an increase in the size or complexity of an apparatus, or an increase in cost, etc.

Furthermore, where the guide substrate and the cap plate are bonded with each other as they are curved due to an external force, if warping is formed in the optical fiber array device by the external force and the contraction stress occurring during hardening of the adhesive, application of an external force in the same direction with the contraction stress of the adhesive increases the warp-induced distortion. On the contrary, application of an external force in the opposite direction to the contraction stress of the adhesive decreases the warp-induced distortion. In this manner, it is possible to adjust the degree of warping by means of adjustment of the contraction stress of the adhesive and the external force.

Furthermore, the present invention provides a method of connecting optical waveguides and optical fibers having the following structure. More precisely, it is a method of connecting optical waveguides and optical fibers with each other, according to which three or more optical waveguides disposed in parallel on an optical waveguide circuit device and among which ones at both ends have a greater optical transmission loss than the central ones, and three or more optical fibers disposed in parallel on an optical fiber array device, wherein the optical connection is simultaneously carried out. Such method being characterized in that at least either one of the parallel optical waveguides or the parallel optical fibers are disposed in parallel such that an axial deviation in the direction perpendicular to the direction of the arrangement increases toward the center of the arrangement from both ends of the parallel disposal arrangement. After such a method, connection terminal surfaces of the optical waveguides and connection terminal surfaces of the corresponding optical fibers are faced with each other such that an axial deviation in the direction perpendicular to the direction of the arrangement increases toward the center of the arrangement, thereby optical connection of the optical waveguides and the corresponding optical fibers is simultaneously carried out.

One of the preferred methods of the optical connection requires the warping of at least either one of the optical waveguide circuit device or the optical fiber array device in the direction perpendicular to the direction of the arrangement of the optical waveguides or the optical fibers, so that at least either one of the parallel optical waveguides or the parallel optical fibers are arranged to ensure that an axial deviation in the direction perpendicular to the direction of the arrangement increases toward the center of the arrangement from both ends of the parallel disposal arrangement.

Furthermore, another method of the optical connection according to the present invention is a method of connecting optical waveguides and optical fibers with each other, according to which three or more optical waveguides disposed in parallel to an optical waveguide circuit device and among which the ones at both ends have a greater optical transmission loss than the central ones, wherein the optical connection is simultaneously carried out with three or more optical fibers which are disposed in parallel to each other in an optical fiber array device. Such method being characterized in that at least either one of a parallel disposal pitch of connection terminal surfaces of the optical waveguides or a parallel disposal pitch of connection terminal surfaces of the optical fibers is uneven, after the optical waveguides and the corresponding optical fibers are faced towards each other such that a degree of deviation between the positions of the connection terminal surfaces of the optical waveguides and the positions of the connection terminal surfaces of the optical fibers increases toward the center of the optical waveguides and the optical fibers disposed in parallel, thereby the optical connection is simultaneously carried out.

Furthermore, the present invention provides an optical waveguide module having the following structure. That is, it is an optical waveguide module which is formed by connecting three or more optical waveguides disposed in parallel to each other in an optical waveguide circuit device, with three or more optical fibers disposed in parallel to each other in an optical fiber array device, such that connection loss increases toward the center from both ends in the direction of the parallel disposal of the optical waveguides or the optical fibers, wherein the optical waveguides of the optical waveguide circuit device are formed such that an optical transmission loss is larger toward both ends from the center of the arrangement of the optical waveguides of the optical waveguide circuit device, and where a loss value combining an optical transmission loss at each optical waveguide with a connection loss with each associated optical fiber is the total loss of a connected pair of each optical waveguide and each associated optical fiber, a difference between the maximum value and the minimum value among the total losses of respective connected pairs is smaller than a difference between the maximum value and the minimum value among the optical transmission losses of the optical waveguides which are disposed in parallel to each other. The difference between the maximum value and the minimum value among the total losses of respective connected pairs of the optical waveguides and the optical fibers is preferably zero.

In the connection method above according to the present invention, first, at least either one of the parallel optical waveguides or the parallel optical fibers are disposed in parallel such that an axial deviation in the direction perpendicular to the direction of the parallel disposal arrangement increases toward the center of the parallel disposal arrangement from both ends of the parallel disposal arrangement or such that at least either one of the parallel disposal pitch of the connection terminal surfaces of the optical waveguides or the parallel disposal pitch of the connection terminal surfaces of the optical fibers is uneven. Therefore, the connection terminal surfaces of the optical waveguides and the corresponding optical fibers are faced toward each other such that deviation increases toward the center of the parallel disposal arrangement, thereby the optical connection is simultaneously carried out.

By the way, while the optical waveguide circuit device which comprises three or more optical waveguides which are disposed in parallel to each other may be a branch optical splitter using slab waveguides, an array waveguide-type diffraction grating, etc., in such an optical waveguide circuit device, optical waveguides at both ends of the parallel disposal arrangement in the optical waveguide circuit device have a larger optical transmission loss than the optical waveguides at around the center of the arrangement.

Hence, where such an optical waveguide circuit device is to be connected to an optical fiber array device, according to the present invention, which requires as described above, facing of the optical waveguides and the corresponding optical fibers towards each other such that deviation between the optical waveguides and the corresponding optical fibers increases toward the center of the optical waveguides and the optical fibers disposed in parallel, thereby simultaneously carrying out the optical connection between the optical waveguides and the optical fibers, making it possible to increase connection loss between the optical waveguides and the corresponding optical fibers toward the center of the optical waveguides or the arranged optical fibers.

Hence, since the optical fiber array device is connected using the connection method as described above to the optical waveguide circuit device, such as a branch optical splitter and an array waveguide-type diffraction grating formed such that optical waveguides at both ends of the parallel disposal of the optical waveguides in the optical waveguide circuit device have a larger optical transmission loss than the optical waveguides at around the center of the parallel disposal of the optical waveguides, it is possible to ensure that a difference between the maximum value and the minimum value among values (total losses of the connected pairs), which combine optical transmission losses of the optical waveguides with connection losses with the corresponding optical fibers, is smaller than a difference between the maximum value and the minimum value among the optical transmission losses of the optical waveguides.

Furthermore, in the connection method according to the present invention, the difference between the maximum value and the minimum value among the total losses of the connected pairs of the optical waveguides and the optical fibers is approximately zero, if the connection above is realized after parallel disposal positions of the optical waveguides for the optical waveguides which are to be disposed in parallel to each other to the optical waveguide circuit device and parallel disposal of the optical fibers positions for the optical fibers which are to be disposed in parallel to each other to the optical fiber array device are formed such that relative positions between the optical waveguides and the optical fibers connection receivers to the other, as they are face with each other have appropriate values which allow to off set differences between the optical transmission losses due to the different parallel disposal of the optical waveguides positions of the optical waveguides.

Hence, application of the connection method according to the present invention eliminates the necessity to insert attenuators or the like as in the prior arts. This realizes smaller size and lower cost of an optical waveguide module which is formed by connecting the optical waveguide circuit de vice and the optical fiber array device with each other.

Furthermore, during the stage of connecting the optical waveguide and the optical fibers with each other, as at least one of the optical waveguide circuit device and the optical fiber array device is curved in the direction perpendicular to the direction of the arrangement of the optical waveguides or the optical fibers, it is possible to dispose the optical waveguides and the optical fibers in parallel very easily in a manner in which at least either one of the parallel optical waveguides or the parallel optical fibers are disposed in parallel such that an axial deviation in the direction perpendicular to the direction of the arrangement increases toward the center of the parallel disposal arrangement from both ends of the parallel disposal arrangement.

Furthermore, with respect to the optical waveguide module according to the present invention, in order to form the optical waveguide module according to the present invention using the connection method above, it is possible to ensure that the difference between the maximum value and the minimum value among the total losses of the connected pairs of the optical waveguides and the optical fibers is zero, for example, which is therefore smaller than the difference between the maximum value and the minimum value among the optical transmission losses of the optical waveguides. This realizes an optical waveguide module of a small size at a low cost, in which optical intensities outputted at a plurality of output terminals are approximately equal to each other, without disposing attenuators or the like.

BRIEF DESCRIPTION OF THE DRAWINGS

Exemplary embodiments of the invention will now be described in conjunction with the drawings in which:

FIGS. 10A and 10B are explanatory views respectively showing a connection terminal surface (FIG. 10A) of a waveguide chip and a connection terminal surface (FIG. 10B) of the optical fiber array device in the optical waveguide module according to the embodiment shown in FIG. 9;

FIG. 11 is a graph showing optical transmission losses of respective optical waveguides, axial deviations between the connection terminal surfaces of the optical waveguides and the optical fibers, connection loss values between the optical waveguides and the optical fibers, and loss values (total loss values) combining optical transmission losses at the optical waveguides with connection losses between the optical waveguides and the corresponding optical fibers, in the optical waveguide module according to the embodiment shown in FIG. 9;

FIG. 12 is an explanatory view showing another embodiment of a method of connecting the optical waveguides and the optical fibers according to the present invention; and FIGS. 13A and 13B are explanatory views respectively showing a connection terminal surface (FIG. 13A) of the waveguide chip and a connection terminal surface (FIG. 13B) of the optical fiber array device, in still other embodiment of a method of connecting the optical waveguides and the optical fibers according to the present invention.

DETAILED DESCRIPTION OF THE PREFERRED EMBODIMENTS

Figure 1A:
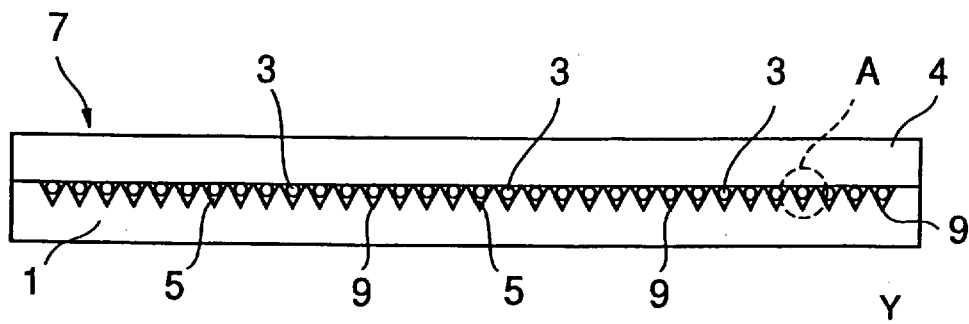
FIGS. 1A and 1B are views showing a structure of an optical fiber array device according to the present invention, together with steps for manufacturing the same.
Figure 1B:
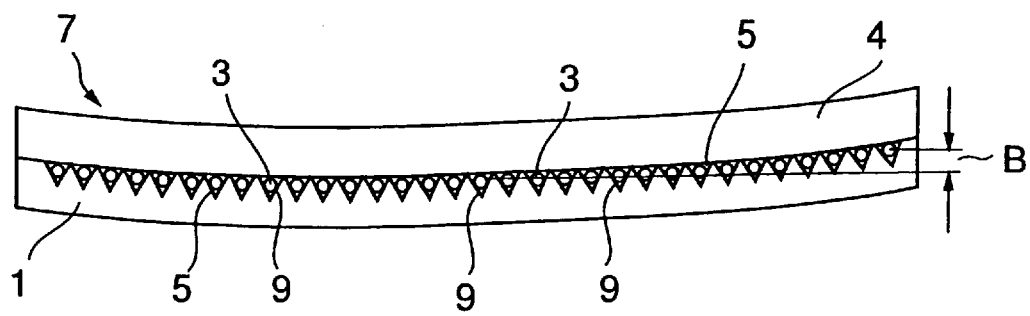

In the following, the present invention will be described in detail based on drawings showing preferred embodiments. In a description regarding the preferred embodiments of the invention, portions which have the same names as those of the conventional examples shown in FIG. 3 will be denoted with the same reference symbols and description of which will be omitted. FIGS. 1A and 1B show a embodiment of a method of manufacturing an optical fiber array device, with the front views of the optical fiber array device 7 viewed from a connection terminal surface. FIG. 1B schematically shows a completed state of the optical fiber array device 7 according to the embodiment.

Figure 3:
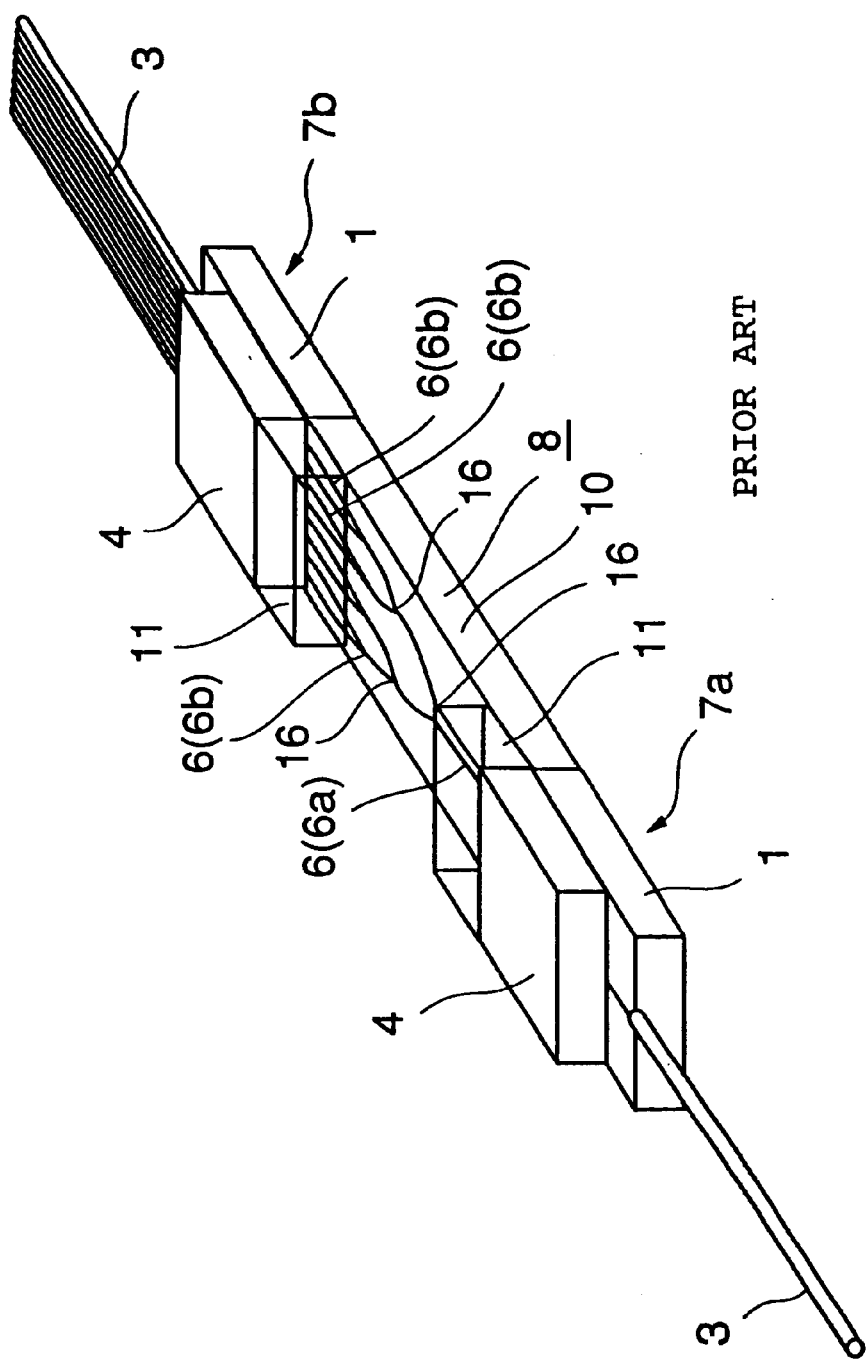
FIG. 3 is a perspective explanatory view showing a module-type optical component (optical waveguide module) which is formed by connecting an optical fiber array device and an optical waveguide circuit device with each other.

The optical fiber array device 7 according to the embodiment of the invention, like the optical fiber array devices 7a and 7b shown in FIG. 3, is characterized in that it comprises a guide substrate 1 and a cap plate 4, and that, as shown in FIG. 1B, warping is created in the optical fiber array device 7 in the direction of the arrangement of the optical fibers 3 (X-direction in the drawing) and because of the warping, the shape of the arrangement at least at the connection terminal surfaces of the optical fibers 3 is a curved shape.

Furthermore, the optical fiber array device 7 according to the embodiment of the invention, as shown in FIG. 1A, is characterized in that the guide substrate 1 and the cap plate 4 are flat without warping and are bonded to each other using an adhesive 5 and that during manufacture of the optical fiber array device 7, warping as above is created in the optical fiber array device 7 using the contraction stress which occurs during hardening of the adhesive 5 as shown in FIG. 1B.

Figure 2:
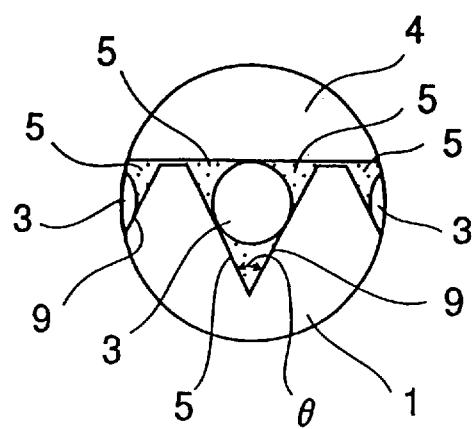
FIG. 2 is an explanatory view expanding inside the frame A shown in FIG. 1A.

The guide substrate 1 and the cap plate 4 are each formed of a Pyrex glass whose thickness is 1 mm. As arranging guide grooves for arranging the optical fibers 3, thirty-two V-shaped grooves 9 are formed in the guide substrate 1. Furthermore, as shown in FIG. 2, the V-groove angle of each V-shaped groove 9 is 60 degrees, and the adhesive 5 which contains a thermosetting epoxy resin and has a hardening contraction rate of approximately 3% is disposed in a gap between a groove surface of the V-shaped grooves 9 and the optical fibers 3 and a gap between a cap surface of the cap plate 4 and the optical fibers 3.

When expressed as the quantity of a deviation in the direction of height (Y-direction in FIG. 1B) between the connection terminal surfaces of the optical fibers 3 at around the center and the connection terminal surfaces of the optical fibers 3 at the ends, the degree of warping of the optical fiber array device 7 according to the embodiment of the invention, as shown in FIG. 1B, has a value of approximately 2 to 3 μm. For clear illustration of the characteristics of the invention, FIG. 1B exaggerates the degree of warping in the schematic view.

According to the embodiment of the invention, the degree of warping of the optical fiber array device 7 is approximately 2 to 3 μm as described above, as shown in FIG. 4A the optical waveguide circuit device 8 which comprises the optical waveguide substrate 10 of silicon at the side of the connection receivers is disposed with the surface seating the optical waveguides 6 facing down contrary to FIG. 4A while the optical fiber array device 7 is as shown in FIG. 1B. In the embodiment, warping is created in the optical fiber array device 7 in accordance with the warping of the optical waveguide circuit device 8 such that the connection terminal surfaces of the optical fibers 3 match with the connection terminal surfaces of the corresponding optical waveguides 6b when the thirty-two optical fibers 3 which are arranged in the optical fiber array device 7 are faced with the thirty-two optical waveguides 6b which are arranged in the output side of the optical waveguide circuit device 8.

The inventor fabricated the optical fiber array device 7 by the manufacturing method described above, and while changing various parameters, i.e., the materials and the thicknesses of the guide substrate 1 and the cap plate 4, the type of the adhesive 5, the number of the V-shaped grooves 9, and the angle of the V-shaped grooves, set up a relationship between respective parameters and the degree of warping of the optical fiber array device 7. The inventor thereafter determined the materials and the thicknesses of the guide substrate 1 and the cap plate 4, the type of the adhesive 5, the number of the V-shaped grooves 9, and the angle of the V-shaped grooves, such that the degree S of warping (2 to 3 μm) of the optical waveguide circuit device 8, , at the side of a connection receiver of the optical fiber array device 7, according to the embodiment of the invention approximately match with the degree B of warping of the optical fiber array device 7.

Figure 4A:
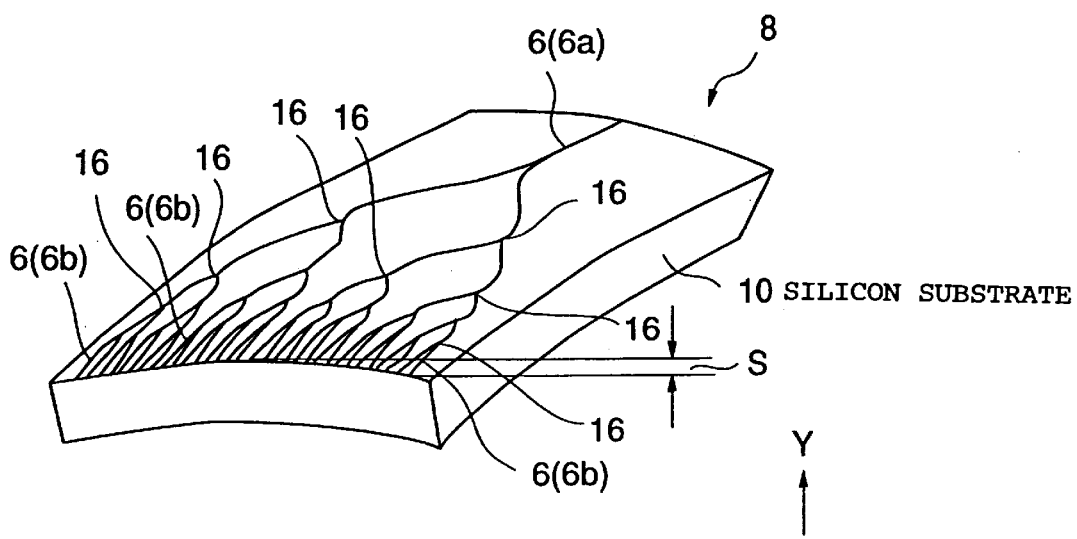
FIGS. 4A and 4B are perspective explanatory views showing a state of warping attributed to a method of manufacturing the optical waveguide circuit device, with the degree of warping exaggerated.

The embodiment of the invention has such a structure as described above, the optical fiber array device 7 according to the embodiment of the invention, as shown in FIG. 4A, for example, is connected to the exit side of the optical waveguide circuit device 8 in which the 1×32-split type optical waveguide circuit is formed on the optical waveguide substrate 10 of silicon. At this stage, the optical waveguide circuit device 8 is disposed with the surface seating the optical waveguides 6 facing down, the optical fiber array device 7 is disposed with the surface seating the guide substrate 1 facing down, and the connection terminal surfaces of the thirty-two optical waveguides 6b which are arranged on the exit side of the optical waveguide circuit device 8 are faced with respective connection terminal surfaces of the thirty-two optical fibers 3 which are arranged in the optical fiber array device 7 according to the embodiment of the invention.

Thus, with respect to the optical fiber array device 7 according to the embodiment of the invention, the warping of the curved shape having the degree B (B=approximately 2 to 3 μm) is created in the optical fiber array device 7 such that the connection terminal surfaces of the optical waveguides 6b approximately match with the connection terminal surfaces of the corresponding optical fibers 3 when the connection terminal surfaces of the optical fibers 3 are faced with the connection terminal surfaces of the optical waveguides 6 of the optical waveguide circuit device 8 as described above. This allows the matching of the connection terminal surfaces of respective optical waveguides 6b with the connection terminal surfaces of the corresponding optical fibers 3, and hence, to connect the optical waveguides 6b with the corresponding optical fibers 3 at a very low connection loss.

The inventor calculated connection losses attributed to axial deviations between the optical fibers 3 and the optical waveguides 6b with respect to the connection described above, and found that the connection losses were 0.5 dB or smaller. The inventor confirmed that it is possible to dramatically reduce connection losses due to axial deviations much more, whereas connection losses of approximately 1.0 through 1.5 dB are created due to the axial deviations between the optical fibers 3 and the optical waveguides 6b when the conventional optical fiber array device 7b is connected with the optical waveguide circuit device 8.

Furthermore, according to the embodiment of the invention, the warping of the optical fiber array device 7 is created by the contraction stress which occurs during hardening of the adhesive 5 which bonds the guide substrate 1 and the cap plate 4 with each other, and therefore, it is very easy to manufacture the optical fiber array device 7. In addition, arbitrarily selecting an adhesive which has a different hardening contraction rate allows adjustment of the degree of warping of the optical fiber array device 7.

Moreover, according to the embodiment of the invention, unlike where an external force application mechanism is disposed externally to the optical fiber array device, for the purpose of warping the optical fiber array device 7 using contraction stress which occurs during hardening of the adhesive 5, the degree of warping of the optical fiber array device 7 does not change in accordance with environmental temperatures where the device is used due to heat-induced expansion of the external force application mechanism. Furthermore, connection losses between the optical fiber array device 7 and the optical waveguide circuit device 8 are kept very low, and it is possible to obtain an optical fiber array device 7 whose size is small at an inexpensive cost without a large-size and complexity or cost for the apparatus.

Figure 4B:
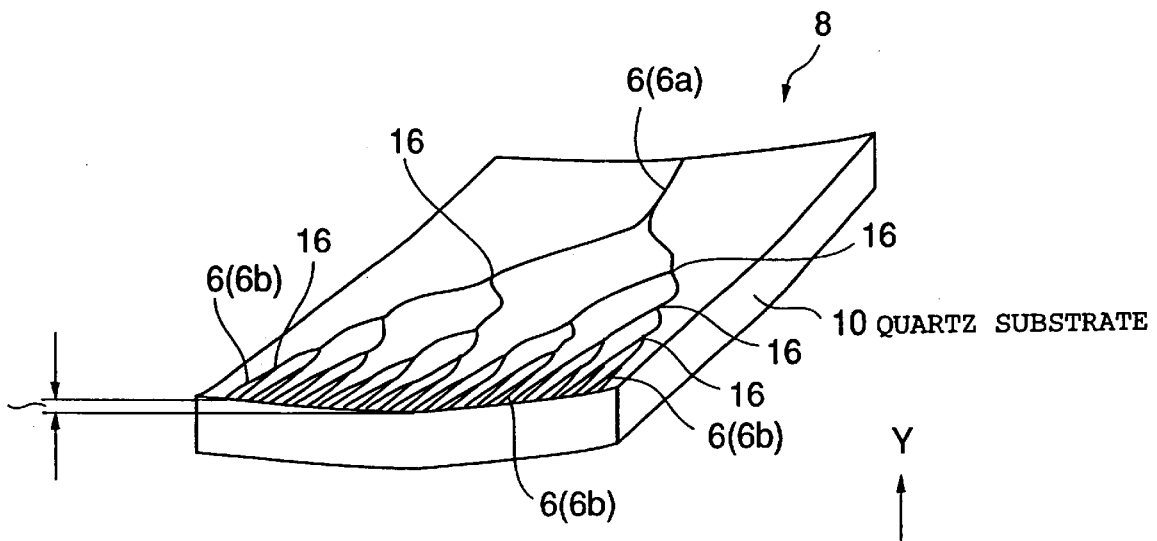

The optical fiber array device according to the present invention is not limited to the embodiment described above, but can be realized as various other embodiments. For example, while the embodiment described above requires that an optical waveguide circuit device 8, at the side of the connection receivers of the optical fiber array device 7, comprises an optical waveguide substrate 10 of silicon, as shown in FIG. 4B, the optical waveguide circuit device 8 at the side of the connection receivers may comprise an optical waveguide substrate 10 of quartz. In this case, as shown in FIG. 3, the optical waveguide circuit device 8 is disposed with the surface seating the optical waveguides 6 facing up and the guide substrate 1 facing down, whereby it is possible to match the direction of warping of the optical waveguide circuit device 8 and the warping of the optical fiber array device 7 to each other.

Furthermore, although the degree of warping of the optical fiber array device 7 is approximately 2 to 3 μm in the embodiment described above, the degree of warping of the optical fiber array device 7 is not particularly limited, but can be set freely. As the optical fiber array device 7 is warped in accordance with the degree of warping of the optical waveguide circuit device 8 such that the connection terminal surfaces of the optical waveguides 6 coincide with the connection terminal surfaces of the corresponding optical fibers 3, the optical waveguides 6 are connected with the corresponding optical fibers 3 at a very low connection loss. Furthermore, while the warping is created in the optical fiber array device 7 only by the contraction stress which occurs during hardening of the adhesive 5 which bonds the guide substrate 1 and the cap plate 4 with each other according to the embodiment above, a stress may be applied from outside the optical fiber array device 7 to harden the adhesive 5 with the optical fiber array device 7 warping, to thereby create warping in the optical fiber array device 7. In this manner, warping is created in the optical fiber array device 7 in a greater degree than where the warping is created only by means of the contraction stress which occurs during hardening of the adhesive 5.

Furthermore, although the optical fiber array device 7 used in the embodiment described above is an optical fiber array device 7 in which the thirty-two optical fibers 3 are arranged, the number of the optical fibers 3 which are arranged in the optical fiber array device 7 is freely set in accordance with the number of the optical waveguides 6 of the optical waveguide circuit device 8 at the side of the connection receiver, or the like.

Furthermore, although the embodiment described above requires that the guide substrate 1 and the cap plate 4 are each formed of a Pyrex glass whose thickness is 1 mm, the adhesive 5 is a thermosetting epoxy resin having a hardening contraction rate of approximately 3% and the V-shaped angle of the V-shaped grooves 9 is 60 degrees, these parameters are not particularly limited but may be set arbitrarily. Changing these parameters makes it possible to ensure that the degree of warping of the optical fiber array device 7 has a desired value.

Furthermore, although the optical fiber arrangement grooves which are formed in the guide substrate 1 are the V-shaped grooves 9 in the embodiment described above, the optical fiber arrangement grooves are not necessarily limited to the V-shaped grooves 9 but may be U-shaped grooves, for example.

The foregoing describing the embodiment assumes that optical transmission losses at respective optical waveguides 6b of the optical waveguide circuit device 8 which is connected to the optical fiber array device 7 are not dependent upon the positions in the arrangement, but are approximately the same as each other (approximately constant). Now, another embodiment of the present invention will be described which is related to connection of the optical fiber array device 7 and the optical waveguide circuit device 8 where optical transmission losses at respective optical waveguides 6b of the optical waveguide circuit device 8 are dependent upon the positions in the arrangement and are therefore different from each other.

Figure 5:
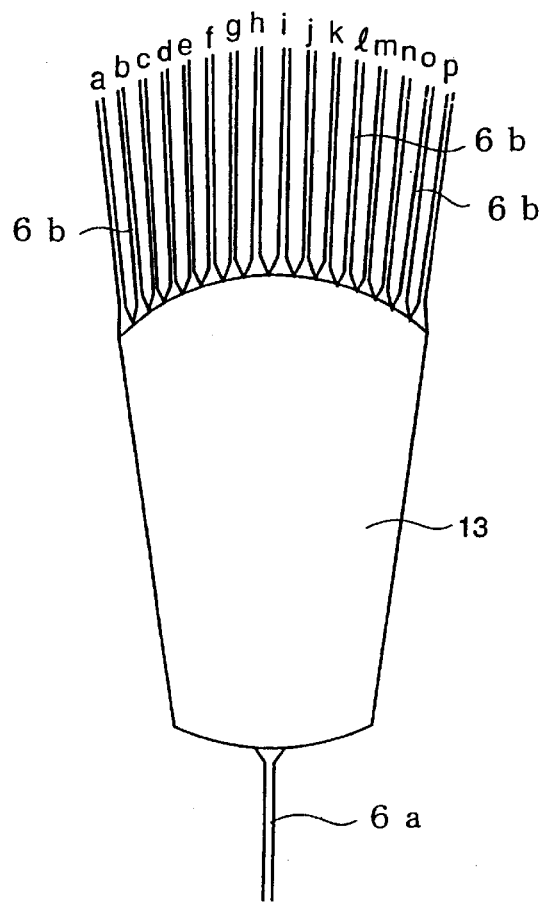
FIG. 5 is an explanatory view showing a 16-branch optical splitter using slab waveguides.

As one example wherein optical transmission losses at respective optical waveguides 6b of the optical waveguide circuit device 8 are dependent upon the positions in the arrangement and therefore different from each other, FIG. 5 shows a structure of a 16-branch optical splitter. The splitter shown in FIG. 5 comprises one light-inputting waveguide 6a, a slab waveguide 13 connected to the exit side of the light-inputting waveguide 6a, and 16 light-outputting waveguides 6b are connected to the exit side of the slab waveguide 13.

In the branch optical splitter, light entering at the light-inputting waveguide 6a expands in the slab waveguide 13 and enters each one of the light-outputting waveguides 6b. Since light travelling in the slab waveguide 13 has an intensity distribution, the intensities of light entering the light-outputting waveguides 6b and propagating in the light-outputting waveguides 6b tend at weaken to the ends of the optical waveguides disposed in parallel from the center of the optical waveguides disposed in parallel. In other words, the optical waveguide circuit device comprising the optical waveguide circuit shown in FIG. 5 has an optical transmission characteristic such that optical transmission losses of respective optical waveguides 6b are larger at both ends of the waveguides disposed in parallel (arrangement) from the center of the waveguides disposed in parallel in the optical waveguide circuit device. Where the optical waveguides 6b are named the a-port, the b-port, . . . the p-port from the left-hand side in FIG. 5, and optical transmission losses at respective ports a through p are as shown in FIG. 6, for instance.

Figure 6:
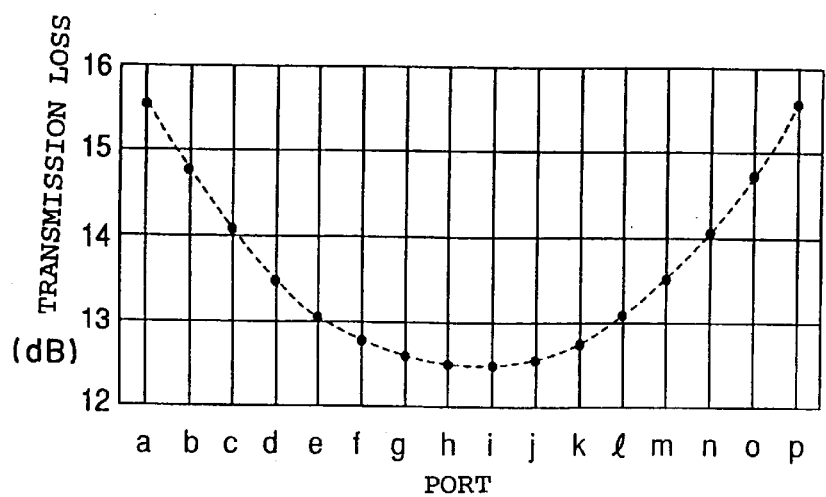
FIG. 6 is a graph showing an example of optical transmission losses at respective ports in the 16-branch optical splitter which is shown in FIG. 5.

That is, as clearly shown in FIG. 6, in the sixteen branch optical splitter, optical transmission losses at the a- and the p-port at both ends of the waveguides disposed in parallel is approximately 3 dB larger than optical transmission losses at the h- and the i-port (the eighth and the ninth port) at around the center of the waveguides disposed in parallel.

Figure 7:
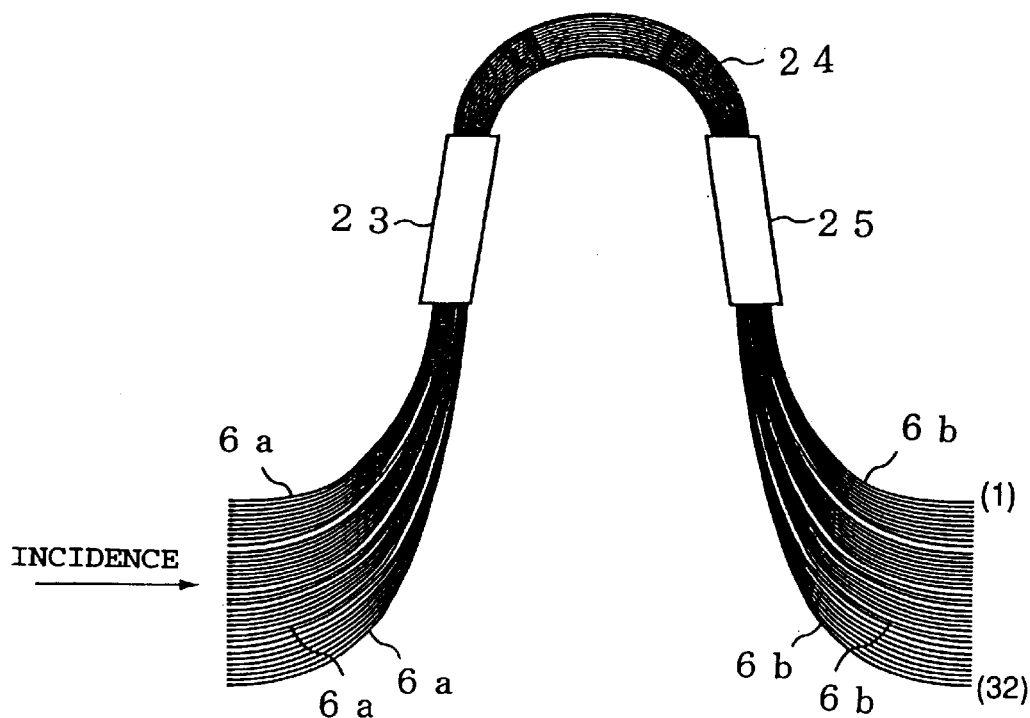
FIG. 7 is an explanatory view showing an array waveguide-type diffraction grating using slab waveguides.

Meanwhile, FIG. 7 shows a structure of a 32-branch array waveguide-type diffraction grating, as an example wherein optical transmission losses, dependent on the positions in the arrangement of the optical waveguides 6b, are different from each other. An input-side slab waveguide 23 is connected to the exit side of thirty-two light-inputting waveguides 6a which are disposed in parallel to each other, a plurality of array waveguides 24 which are disposed in parallel to each other are connected to the exit side of the input-side slab waveguide 23, and thirty-two light-outputting waveguides 6b which are disposed in parallel to each other are connected to the exit side of an output-side slab waveguide 25, as shown in FIG. 7.

The array waveguides 24 are for propagating light which emits from the input-side slab waveguide 23, and are formed to have different lengths from each other. While the array waveguides 24 are usually disposed in a great number, such as 100, for example, FIG. 7 shows only a reduced number of the array waveguides 24 for simplicity of illustration.

Sending-side optical fibers are connected to the light-inputting waveguides 6a, which allows the introduction of wavelength-multiplexed light. Light allowed into the input-side slab waveguide 23 through the light-inputting waveguides 6a, being diffracted, spreads and impinges upon the plurality of array waveguides 24, and propagates through each one of the array waveguides 24. While the light propagated through the array waveguides 24 reaches the output-side slab waveguide 25, and converges in and exits the light-outputting waveguides 6b, since respective array waveguides 24 have different lengths from each other, individual light rays have phase differences from each other after being propagated through respective array waveguides 24. As wavefronts of the converged light tilt in accordance with quantities of the phase differences and positions of convergence are determined by the tilt angles, the converging positions of the light rays having different wavelengths from each other are different from each other. The light-outputting waveguides 6b are formed at these positions, and therefore, it is possible to allow the light rays having different wavelengths from each other to exit at the different light-outputting waveguides 6b respectively for the different wavelengths.

Furthermore, when the light enters the output-side slab waveguide 25 from the array waveguides 24, since a diffractive effect differs depending on the direction of diffraction of light and an optical intensity accordingly differs, in the array waveguide-type diffraction grating as well, the intensities of the light emitted at respective light-outputting waveguides 6b tend to weaken to both ends of the waveguides disposed in parallel (arrangements) from the center of the waveguides disposed in parallel (arrangements), as in a branch optical splitter.

Figure 8:
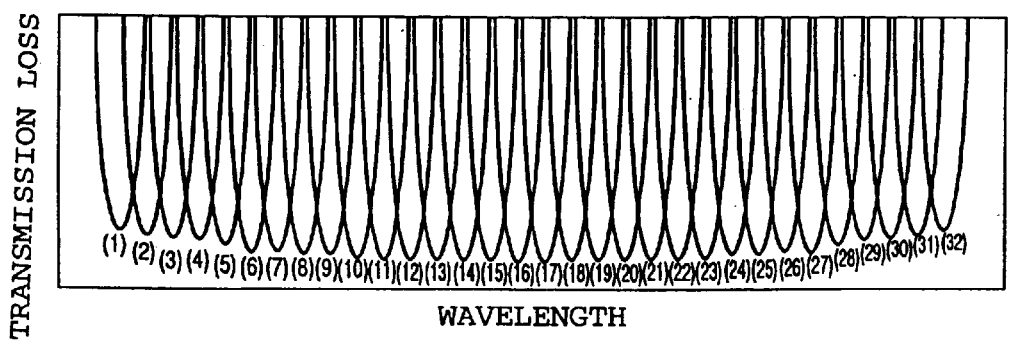
FIG. 8 is a graph showing an example of an optical transmission loss characteristic of light which is outputted from respective output waveguides of an array waveguide-type diffraction grating.

Hence, in the array waveguide-type diffraction grating above, assuming that the port numbers of respective light-outputting waveguides 6b are (1) to (32) from the top in FIG. 7, wavelength-dependencies of the optical transmission losses of respective ports (1) to (32) areas shown in FIG. 8. Therefore, in the array waveguide-type diffraction grating as well, the optical transmission losses become larger from the center of the waveguides disposed in parallel (arrangement) of the light-outputting waveguides 6b toward the ends of the waveguides disposed in parallel. With respect to a peak value of the optical transmission losses, a difference between the minimum value (peak optical transmission loss values at the ports (16) and (17)) and the maximum value (peak optical transmission loss values at the ports (1) and (32)) can be as much as 3 dB to 4 dB, for example.

When an optical waveguide module comprised as that described above comprising a plurality of optical waveguides is to be used for optical communications, it is necessary that light intensities emitted from the optical fibers which are connected with respective plurality of light-outputting waveguides 6b, for example, are uniform, that is, there is no difference between optical transmission losses at the ports which constitute the optical waveguide module.

However, as described above, in an optical waveguide circuit device such as a branch optical splitter and an array waveguide-type diffraction grating, light intensities from the light-outputting waveguides 6b which are disposed in parallel to each other become smaller with distance to the ends of the waveguides disposed in parallel from the center of the waveguides disposed in parallel, and differences in optical transmission loss between the ports at about the center of the arrangement and the ports at the ends of the arrangement may be as large as 3 dB to 4 dB in the optical waveguide circuit device. Hence, when the optical waveguide circuit device 8 is connected simply with the optical fibers of warping of the optical fiber array device 7 to form an optical waveguide module, it is not possible to meet the requirement above.

Accordingly, the conventional techniques use an attenuator or the like to thereby suppress a transmission characteristic of the light which exits at the light-outputting waveguides 6b at about the center of the waveguides disposed in parallel, so that a different becomes small between the maximum value and the minimum value among the total losses (which are losses obtained by adding the optical transmission losses of the optical waveguides to the connection losses between the optical waveguides and the optical fibers) between the optical waveguides and the optical fibers in the optical waveguide module. Use of an attenuator or the like in this manner leads to a large-size and increased cost of an optical waveguide module, which is a problem.

An embodiment described of the present invention described below aims at solving this problem. When optical connection of three or more optical waveguides disposed in parallel to each other in an optical waveguide circuit device is simultaneously carried out, with three or more optical fibers disposed in parallel to each other in an optical fiber array device, it is ensured that total losses of the optical waveguides and the optical fibers are as uniform as possible, and hence, to provide a small-size and low-cost optical waveguide module in which the difference between the total losses of the connected pairs (the connected pairs of the optical waveguides and the optical fibers) described earlier is small.

Figure 9:
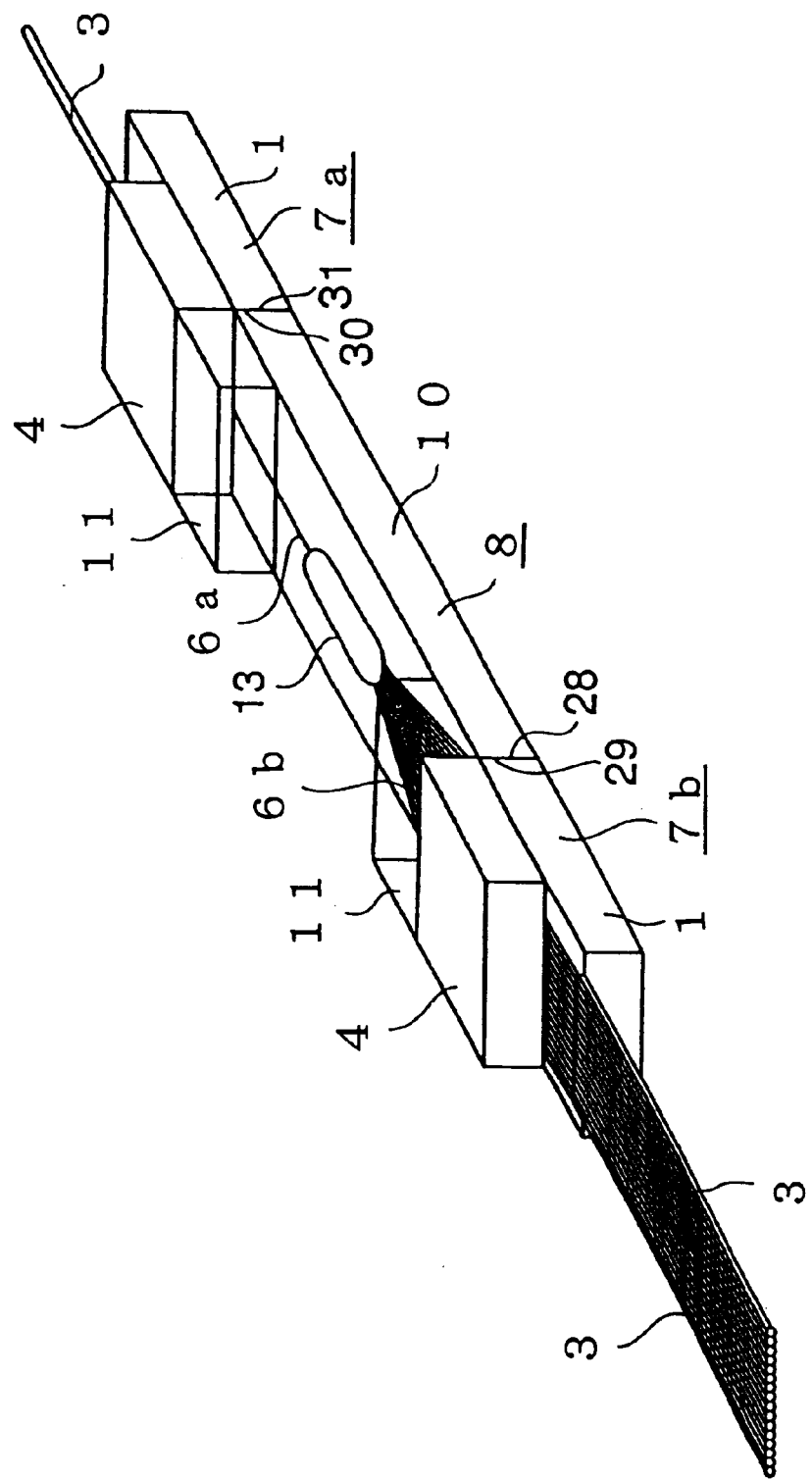
FIG. 9 is a perspective structure view showing an embodiment of an optical waveguide module which is formed using a method of connecting optical waveguides and optical fibers with each other according to the present invention.

FIG. 9 is a perspective view showing an embodiment of an optical waveguide module which is obtained using a method of connecting optical waveguides and optical fibers according to the present invention. The optical waveguide module shown in FIG. 9 is formed, whereby an optical fiber array device 7b is connected to one end of an optical waveguide circuit device 8 of a waveguide chip and an optical fiber fixing device (optical fiber array device) 7a is connected to the other end of the optical waveguide circuit device 8.

A waveguide pattern of a 16-branch optical splitter as shown in FIG. 5 is formed on an optical waveguide substrate 10 and glass plates (upper glass plates) 11 are disposed respectively to upper portions of light-inputting waveguides 6a and light-outputting waveguides 6b of the 16-branch optical splitter, whereby the optical waveguide circuit device 8 is formed.

One light-inputting optical fiber 3 is inserted and fixed to one V-shaped groove (not illustrated) which is formed in a guide substrate 1, and a cap plate 4 for capping the optical fiber 3 is formed on the front surface side of the guide substrate 1, where by the optical fiber array device 7a is formed. The optical fiber 3 is optically connected to the light-inputting waveguides 6a which are formed in the optical waveguide circuit device 8. Light-outputting optical fibers 3 are inserted and each fixed to each one of sixteen V-shaped grooves (not illustrated) which are formed in the guide substrate 1, and the cap plate 4 for capping the optical fibers 3 is formed on the front surface side of the guide substrate 1, whereby the optical fiber array device 7b is formed. The respective optical fibers 3 are optically connected to the light-outputting waveguides 6b which are formed in the optical waveguide circuit device 8.

A connection terminal surface of one optical fiber 3 is polished together with a connection terminal surface 31 of the optical fiber array device 7a. In a similar manner, connection terminal surfaces of the sixteen optical fibers 3 are polished together with a connection terminal surface 29 of the optical fiber array device 7b, and connection terminal surfaces of the light-inputting waveguides 6a and the light-outputting waveguides 6b are polished together with connection terminal surfaces 30 and 28 of the optical waveguide circuit device 8. The connection terminal surface 31 of the optical fiber array device 7a is fixed to the connection terminal surface 30 of the optical waveguide circuit device 8 using an adhesive, while the connection terminal surface 28 of the optical waveguide circuit device 8 is fixed to the connection terminal surface 29 of the optical fiber array device 7b using an adhesive.

A characteristic of this embodiment is that a unique connection method as described below is used as the method of connecting the sixteen light-outputting waveguides 6b disposed in parallel to each other in the optical waveguide circuit device 8, with the sixteen optical fibers 3 disposed in parallel to each other in the optical fiber array device 7b, to thereby form the optical waveguide circuit device 8.

That is, both parallel light-outputting waveguides 6b and the parallel optical fibers 3 are disposed in parallel to each other such that an axial deviation in the direction perpendicular to the direction of the arrangements increases with distance toward the center of the waveguides disposed in parallel (arrangements) from both ends of the waveguides disposed in parallel (both ends of the direction of the arrangement), the connection terminal surfaces 28 and 29 of the light-outputting waveguides 6b and the corresponding optical fibers 3 are faced with each other such that an axial deviation in the direction perpendicular to the direction of the waveguides disposed in parallel increases with distance toward the center of the waveguides disposed in parallel, and following this, the optical connection between the light-outputting waveguides 6b and the corresponding optical fibers 3 is simultaneously carried out.

In this embodiment, as shown in FIGS. 10A and 10B, the optical waveguide circuit device 8 and the optical fiber array device 7b are warped in the form of an arc in the Y-direction which is perpendicular to the direction of the arrangement (X-direction in the FIGS. 10A and 10B) of the light-outputting waveguides 6b or the optical fibers 3, whereby both parallel light-outputting waveguides 6b and the parallel optical fibers 3 are disposed such that an axial deviation in the direction perpendicular to the direction of the waveguides disposed in parallel (arrangements) is larger toward the center of the waveguides disposed in parallel. The optical waveguide circuit device 8 is warped in a convex shape so as to protrude toward the top of FIGS. 10A and 10B, while the optical fiber array device 7b is warped in a convex shape so as to protrude toward the bottom of FIGS. 10A and 10B.

After forming the optical waveguide circuit device 8 and the optical fiber array device 7b in this manner, in this embodiment, as described above, the connection terminal surfaces 18 and 19 of the light-outputting waveguides 6b and the corresponding optical fibers 3 are faced with each other such that an axial deviation in the direction perpendicular to the direction of the arrangements increases with distance toward the center of the waveguides disposed in parallel, and following this, the optical connection between the light-outputting waveguides 6b and the corresponding optical fibers 3 are simultaneously carried out.

As the optical waveguide circuit device 8 and the optical fiber array device 7b are connected by such a connection method to form the optical waveguide module, the optical waveguide module according to this embodiment has the following characteristic. That is, assuming that a value combining an optical transmission loss at each light-outputting waveguide 6b of the optical waveguide module with a connection loss between each light-outputting waveguide 6b and the corresponding optical fiber 3 of the optical waveguide module is a total loss of the connected pair of each light-outputting waveguide 6b and the corresponding optical fiber 3, a difference between the maximum value and the minimum value among the total losses of the connected pairs is smaller than a difference (3 dB) between the maximum value and the minimum value among the optical transmission losses of the light-outputting waveguides 6b.

More specifically, assuming that the light-outputting waveguides 6b of the 16-branch optical splitter of the optical waveguide circuit device 8 are named the a-port, the b-port, . . . the p-port from the left-hand side (the far side) in FIG. 9 as described earlier, axial deviations between the connection terminal surfaces 18 of respective light-outputting waveguides 6b which are the a-port through the p-port and the connection terminal surfaces 19 of the corresponding optical fibers 3 are as denoted at a characteristic curve B in FIG. 11, which shows that an axial deviation quantity is approximately 4.25 $\mu$m in the vicinity of the h-port and the i-port which are at the center.

A characteristic curve C in FIG. 11 expresses connection losses between respective light-outputting waveguides 6b which are the a-port through the p-port and the corresponding optical fiber 3. The characteristic curve C is a result of simulation based on the characteristic curve B, which assumes that an axial deviation coefficient between the light-outputting waveguides 6b and the optical fiber 3 is generally 0.17. Connection losses are approximately 3 dB, between the light-outputting waveguides 6b around the central h-port and the central i-port and the corresponding optical fibers 3.

On the other hand, as described earlier, the optical transmission losses of respective light-outputting waveguides 6b which are the a-port through the p-port, as denoted at a characteristic curve A in FIG. 11, have an optical transmission characteristic in that the optical transmission losses of the light-outputting waveguides 6b at both ends of the waveguides disposed in parallel are larger than those of the light-outputting waveguides 6b at around the center of the waveguides disposed in parallel. A difference between the maximum value and the minimum value among the optical transmission losses is approximately 3 dB. From this, the total losses of the connected pairs of the light-outputting waveguides 6b and the optical fibers 3 are as denoted at a characteristic curve D in FIG. 11.

In short, as denoted at the characteristic curve D in FIG. 11, a difference between the maximum value and the minimum value among the total losses of respective connected pairs is 0.1 dB or smaller (approximately zero), which is far smaller than 3 dB which is the difference between the maximum value and the minimum value among the optical transmission losses of the light-outputting waveguides 6b.

According to this embodiment, as described above, when connecting the optical waveguide circuit device 8 which comprises the 16-branch optical splitter, in which the optical transmission losses of the light-outputting waveguides 6b are larger at both ends of the waveguides disposed in parallel (arrangement position) than at around the center of the waveguides disposed in parallel, and the optical fiber array device 7b with each other, both parallel light-outputting waveguides 6b and the parallel optical fibers 3 are disposed in parallel such that an axial deviation in the direction perpendicular to the direction of the arrangements increases with distance toward the center of the waveguides disposed in parallel (arrangements) from both ends of the arrangements. Following this, the light-outputting waveguides 6b and the optical fibers 3 which are connection receivers for each other, are faced and connected with each other such that an axial deviation in the direction perpendicular to the direction of the arrangements of the light-outputting waveguides 6b and the optical fibers 3 increases with distance toward the center of the waveguides disposed in parallel of the light-outputting waveguides 6b and the optical fibers 3. Hence, it is possible to ensure that a difference between the maximum value and the minimum value among the total losses of the connected pairs of the light-outputting waveguides 6b and the optical fibers 3 has a smaller value than a difference between the maximum value and the minimum value among the optical transmission losses of the light-outputting waveguides 6b.

This embodiment particularly requires to realize the connection above, after the parallel disposal positions of the light-outputting waveguides 6b, which are to be disposed in parallel with each other in the optical waveguide circuit device 8, and the parallel disposal positions of the optical fibers 3, which are to be disposed in parallel with each other in the optical fiber array device 7b, are formed such that the relative positions of the light-outputting waveguides 6b and the optical fibers 3, which are connection receivers for each other when faced with each other, have such appropriate values which offset the differences among the optical transmission losses due to the differences among the parallel disposal positions of the light-outputting waveguides. In this manner, the difference between the maximum value and the minimum value among the total losses of the connected pairs of the light-outputting waveguides 6b and the optical fibers 3 is approximately zero.

Hence, according to this embodiment, since it is possible to form an optical waveguide module without inserting an attenuator or the like as in the prior arts, it is possible to ensure that the optical waveguide module has a small size and requires only a low cost.

Furthermore, according to this embodiment, since the optical waveguide circuit device 8 and the optical fiber array device 7b are warped in the form of an arc in the direction perpendicular to the direction of the arrangement of the light-outputting waveguides 6b or the optical fibers 3, with respect to both connection terminal surfaces 18 of the parallel light-outputting waveguides 6b and the connection terminal surfaces 19 of the parallel optical fibers 3, an axial deviation in the direction perpendicular to the direction of the waveguides disposed in parallel (arrangements) increases with distance toward the center of the waveguides disposed in parallel from both ends of the waveguides disposed in parallel. Hence, with respect to both connection terminal surfaces 18 of the parallel light-outputting waveguides 6b and the connection terminal surfaces 19 of the parallel optical fibers 3, it is possible to easily adjust the quantities of axial deviations in the direction perpendicular to the direction of the arrangements at both ends of the waveguides disposed in parallel, and therefore very easily manufacture an excellent optical waveguide module as that described above.

The connection method and the optical waveguide module according to the present invention are not limited to the embodiment described above, but can be realized as various other embodiments. For example, while the embodiments shown in FIGS. 9, 10A and 10B require that both light-outputting waveguides 6b and the optical fibers 3 are such that an axial deviation in the direction perpendicular to the direction of the waveguides disposed in parallel is larger toward the center of the waveguides disposed in parallel from both ends of the waveguides disposed in parallel, either one of the light-outputting waveguides 6b or the optical fibers 3 maybe disposed in parallel to each other such that an axial deviation in the direction perpendicular to the direction of the waveguides disposed in parallel (arrangement direction) is larger from both ends of the waveguides disposed in parallel toward the center of the waveguides disposed in parallel.

In this case as well, the optical connection between the light-outputting waveguides 6b and the corresponding optical fibers 3 may be simultaneously carried out after the connection terminal surfaces 18 and 19 of the light-outputting waveguides 6b and the corresponding optical fibers 3 are faced with each other such that an axial deviation in the direction perpendicular to the direction of the arrangement increases with distance toward the center of the waveguides disposed in parallel, whereby a similar effect to those according to the embodiments above is obtained.

Furthermore, the foregoing has described that the connection terminal surfaces 18 of the parallel light-outputting waveguides 6b and the connection terminal surfaces 19 of the parallel optical fibers 3 are such that an axial deviation in the direction perpendicular to the direction of the waveguides disposed in parallel (arrangements) increases from both ends of the waveguides disposed in parallel toward the center of the waveguides disposed in parallel. However, for example, as shown in FIG. 12, the optical connection between the light-outputting waveguides 6b and the corresponding optical fibers 3 may be simultaneously carried out, after at least either one of the connection terminal surfaces 18 of the optical waveguides 6b or the connection terminal surfaces 19 of the optical fibers 3 are disposed in parallel to each other at an uneven pitch and faced with each other such that the quantities of deviations between the positions of the connection terminal surfaces 18 of the optical waveguides 6b and the positions of the connection terminal surfaces 19 of the corresponding optical fibers 3 are larger toward the center of the waveguides disposed in parallel.

In FIG. 12, axial lines show the positions of the axle centers respectively of the optical waveguides 6b and the optical fibers 3. The parallel disposal pitch of the connection terminal surfaces 18 of the optical waveguides 6b is uneven in FIG. 12.

Furthermore, the embodiments above require warping of the optical waveguide circuit device 8 and the optical fiber array device 7b toward the opposite sides from each other in the direction perpendicular to the direction of the arrangement of the optical waveguides 6b or the optical fibers 3, the optical waveguide circuit device 8 and the optical fiber array device 7b may be warped in the same direction as each other but in different degrees (degrees of warping) to each other. In such a case as well, as the optical connection between the light-outputting waveguides 6b and the corresponding optical fibers 3 is simultaneously carried out after the connection terminal surfaces 18 and 19 of the light-outputting waveguides 6b and the corresponding optical fibers 3 are faced with each other such that an axial deviation in the direction perpendicular to the direction of the waveguides disposed in parallel (arrangements) increases with distance toward the center of the waveguides disposed in parallel, a similar effect to those according to the embodiments above is obtained.

Moreover, without warping the optical waveguide circuit device 8 and the optical fiber array device 7b, as shown in FIGS. 13A and 13B, the front surface of the optical waveguide substrate 10 of the optical waveguide circuit device 8 may be formed as a curved surface and the light-outputting waveguides 6b may be accordingly arranged on the curved line, or alternatively, the front surface of the guide substrate 1 of the optical fiber array device 7b may be formed as a curved surface and the optical fibers 3 may be accordingly arranged on the curved line, and at least either one of the parallel optical waveguides 6b or the parallel optical fibers 3 may be disposed in parallel such that an axial deviation in the direction perpendicular to the direction of the arrangement increases with distance toward the center of the waveguides disposed in parallel from both ends of the waveguides disposed in parallel. The connection terminal surfaces 18 and 19 of the light-outputting waveguides 6b and the corresponding optical fibers 3 may be thereafter faced with each other such that an axial deviation in the direction perpendicular to the direction of the arrangement increases with distance toward the center of the waveguides disposed in parallel, and the optical connection between the light-outputting waveguides 6b and the corresponding optical fibers 3 may be simultaneously carried out.

Furthermore, the connection terminal surface 28 of the optical waveguide circuit device 8 may be a curved surface which recedes at the center of the parallel disposal of the light-outputting waveguides 6b and the connection terminal surface 29 of the optical fiber array device 7b may be a curved surface which recedes at the center of the waveguides disposed in parallel of the optical fibers 3, to thereby ensure a gap between the connection terminal surfaces 18 of the light-outputting waveguides 6b at around the center of the waveguides disposed in parallel and the connection terminal surfaces 19 of the optical fibers 3 at around the center of the waveguides disposed in parallel so that the sizes of the clearances between the positions of the connection terminal surfaces 18 of the light-outputting waveguides 6b and the positions of the connection terminal surfaces 19 of the optical fibers 3 increase toward the center of the waveguides disposed in parallel (arrangement).

Furthermore, two or more of the methods described above may be combined with each other, so that the relative positions of the connection terminal surfaces 18 and 19 of the light-outputting waveguides 6b and the optical fibers 3, which are connection receivers for each other when faced with each other, shift from each other more greatly toward the center of the waveguides disposed in parallel.

Whichever method may be used, the quantities of deviations (or the sizes of the gaps) between the connection terminal surfaces 18 and 19 with the light-outputting waveguides 6b and the optical fibers 3 faced with each other may be determined in advance, such that the connection losses between the light-outputting waveguides 6b and the optical fibers 3 which correspond to the light-outputting waveguides 6b become larger toward the center of the waveguides disposed in parallel of the light-outputting waveguides 6b and the optical fibers 3. This allows, as in the embodiments described above, connection of the optical fiber array device 7b with the optical waveguide circuit device 8 which comprises a 16-branch optical splitter or the like, in which the optical transmission losses of the light-outputting waveguides 6b are larger at both ends of the waveguides disposed in parallel than at around the center of the waveguides disposed in parallel, to thereby form an optical waveguide module in which a difference between the maximum value and the minimum value among the total losses of the connected pairs of the light-outputting waveguides 6b and the optical fibers 3 is smaller than a difference between the maximum value and the minimum value among the optical transmission losses of the light-outputting waveguides 6b.

Furthermore, although a difference between the maximum value and the minimum value among the total losses of the connected pairs of the light-outputtihg waveguides 6b and the optical fibers 3 is 0.1 dB or smaller, which is a value approximately close to zero, in the embodiment described above, the optical waveguide module according to the present invention only requires that the difference between the maximum value and the minimum value among the total losses of the connected pairs of the light-outputting waveguides and the optical fibers is smaller than the difference between the maximum value and the minimum value among the optical transmission losses of the light-outputting waveguides. Therefore, the difference between the maximum value and the minimum value among the total losses of the connected pairs may be approximately 1.5 dB, for instance.

Furthermore, while the optical waveguide circuit device 8 which comprises a 16-branch optical splitter is connected with the optical fiber array device 7b to form an optical waveguide module in the embodiment described above, the optical waveguide circuit device 8 does not necessarily comprise a 16-branch optical splitter but may comprise an optical splitter other than the 16-branch type, or may comprise an array waveguide-type diffraction grating, for example.

What is claimed is:

1. An optical fiber array device comprising:
   a guide substrate formed with a plurality of optical fiber arranging guide grooves;
   a cap plate configured to cap optical fibers inserted into said optical fiber arranging guide grooves; and
   an adhesive configured to attach the guide substrate to the cap plate, wherein
     a number of the optical fiber arranging guide grooves of said guide substrate is at least 32,
     the guide substrate has a warp formed therein in a direction of arranging said optical fibers resulting from a contraction stress imparted by tile adhesive when hardened, and
     the warp in the guide substrate is controlled by the contraction stress so as to impart a predetermined curved shape on at least a connection terminal surface side of the optical fibers so as to enable alignment with an optical waveguide.

2. The optical fiber array device according to claim 1 wherein
   said guide substrate is bonded to said cap plate when warped by an applied external force and said contraction stress.

3. The optical fiber array device according to claim 1, wherein
   an amount of the warp is set such that a connection terminal surface of said plurality of optical fibers substantially aligns with a connection terminal surface of a corresponding plurality of optical waveguides.

4. The optical fiber array device according to claim 2, wherein
   an amount of the warp is set such that a connection terminal surface of said plurality of optical fibers substantially aligns with a connection terminal surface of a corresponding plurality of optical waveguides.

5. A method for optically connecting a plurality of optical waveguides arranged side by side in a warped optical waveguide circuit device and having substantially equal transmission losses to a plurality of optical fibers arranged side by side in a warped optical fiber array device including at least 32 fibers, comprising steps of:
   inserting an optical fiber of said optical fiber array device into an arranging guide groove of a guide substrate, said guide groove capped with a cap plate;
   warping, by a contraction stress associated with hardening an adhesive for attaching said guide substrate to the cap plate, the optical fiber array device so as to substantially align the optical fiber array device with a curved shape of said optical waveguide circuit device; and
   optically connecting one of the plurality of optical waveguides to a corresponding one of the plurality of optical fibers, wherein
     said warping is controlled so as to reduce an axial deviation between a corresponding pair of optical waveguides and optical fibers.

6. The method according to claim 5, wherein
   the guide substrate is attached to the cap plate such that an external force is applied to warp and deform the guide substrate and the cap plate; and the optical fiber array device is warped by the external force and the contraction stress.

7. A method for optically connecting a plurality of optical waveguides, arranged side by side in warped optical waveguide circuit device and having substantially equal transmission losses to a plurality of optical fibers arranged side by side in a warped optical fiber array device including at least 32 fibers, comprising steps of:

inserting an optical fiber of said optical fiber array device into an arranging guide groove of a guide substrate, said guide groove capped with a cap plate;

warping, by a contraction stress associated with hardening an adhesive for attaching said guide substrate to the cap plate, the optical fiber array device so as to substantially align the optical fiber array device with a curved shape of said optical waveguide circuit device; and optically connecting one of the plurality of optical waveguides to a corresponding one of the plurality of optical fibers, wherein said warping is controlled so as to increase an axial deviation in a direction orthogonal to an arranging direction.

8. The method according to claim 7, wherein the guide substrate is attached to the cap plate such that an external force is applied to warp and deform the guide substrate and the cap plate; and the optical fiber array device is warped by the external force and the contraction stress.

9. The method according to claim 7, wherein said warping is controlled to form an optical array device warpage that corresponds to an optical waveguide circuit device warpage so that a connection terminal surface of the plurality of optical waveguides are substantially aligned with a facing connection terminal surface of the plurality of optical fibers corresponding thereto.

10. The method according to claim 8, wherein said warping is controlled to form an optical array device warpage that corresponds to an optical waveguide circuit device warpage so that a connection terminal surface of the plurality of optical waveguides is substantially aligned with a facing connection terminal surface of the plurality of optical fibers corresponding thereto.

11. An optical waveguide module, comprising:

a plurality of optical waveguides arranged side by side in an optical waveguide circuit device and connected to a plurality of optical fibers arranged side by side in an optical fiber array device, wherein said plurality of optical fibers are inserted into arranging guide grooves, capped with a cap plate, and configured to have greater connection losses at a fiber longitudinal center than at a fiber longitudinal end, the plurality of optical waveguides are configured to have greater transmission losses at a waveguide longitudinal end than in a waveguide longitudinal center, a number of optical fibers in the optical fiber array device is at least 32, the optical fiber array device is warped by a contraction stress associated with hardening an adhesive attaching the guide substrate to the cap plate, and a difference between a maximum total loss and a minimum total loss is smaller than a difference between a maximum optical transmission loss and a minimum optical transmission loss of a corresponding optical waveguide, a total loss of a optical fiber/optical waveguide pair being the sum of an optical waveguide transmission loss and an optical fiber connection loss.

12. The optical waveguide module according to claim 11, herein the guide substrate is attached to the cap plate so as to apply an external force to warp and deform the guide substrate and the cap plate, thereby warping said optical fiber array device with the external force and the contraction stress.

13. The optical waveguide module according to claim 11, wherein the difference between the maximum total loss and the minimum total loss is approximately zero.

14. The optical waveguide module according to claim 12, wherein the difference between the maximum total loss and the minimum total loss is approximately zero.

* * * * *